US012684053B2

(12) United States Patent
Takizawa

(10) Patent No.: US 12,684,053 B2
(45) Date of Patent: Jul. 14, 2026

(54) DATA TRANSMISSION SYSTEM

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventor: Tetsuro Takizawa, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 21 days.

(21) Appl. No.: 18/734,148

(22) Filed: Jun. 5, 2024

(65) Prior Publication Data

US 2025/0023963 A1     Jan. 16, 2025

(30) Foreign Application Priority Data

Jul. 11, 2023     (JP) ................................. 2023-113492

(51) Int. Cl.
$H04L\ 69/24$      (2022.01)
$H04L\ 69/08$      (2022.01)
$H04L\ 69/14$      (2022.01)
(52) U.S. Cl.
CPC .............. *H04L 69/24* (2013.01); *H04L 69/08* (2013.01); *H04L 69/14* (2013.01)
(58) Field of Classification Search
CPC ......... H04L 69/24; H04L 69/08; H04L 69/14; H04L 5/1415; H04L 5/1438; H04L 5/16; H04L 5/14
See application file for complete search history.

(56) References Cited

U.S. PATENT DOCUMENTS

2006/0221843 A1* 10/2006 Cidon ..................... H04L 43/50
                                        370/242
2007/0127705 A1* 6/2007 Wang ................ H04M 3/42017
                                    379/373.01

(Continued)

OTHER PUBLICATIONS

PCI Express Base Specification Revision 5.0 Version 1.0, PCI-SIG, May 22, 2019, pp. 1-1299. (Discussed on p. 1 of the specification).

(Continued)

*Primary Examiner* — Tonia L Dollinger
*Assistant Examiner* — Mehulkumar J Shah
(74) *Attorney, Agent, or Firm* — Posz Law Group, PLC

(57) ABSTRACT

A data transmission system executes data transmission bidirectionally between two electronic devices. The data transmission system includes a first unidirectional transmission path, a second unidirectional transmission path, a bidirectional transmission path, and a transmission direction setting device. The first unidirectional transmission path allows data transmission in a first direction from one of the two electronic devices to another one of the two electronic devices. The second unidirectional transmission path allows data transmission between the two electronic devices in a second direction being opposite to the first direction. The bidirectional transmission path allows data transmission between the two electronic devices in a data transmission direction set to be either the first direction or the second direction. The transmission direction setting device sets the data transmission direction for the bidirectional transmission path.

9 Claims, 7 Drawing Sheets

(56) References Cited

U.S. PATENT DOCUMENTS

| | | | | |
|---|---|---|---|---|
| 2010/0214960 A1* | 8/2010 | Bahr | H04W 76/12 | 370/254 |
| 2010/0275234 A1* | 10/2010 | Kamon | H04N 21/4122 | 725/153 |
| 2019/0196722 A1* | 6/2019 | Er | G06F 3/0659 | |
| 2020/0212943 A1* | 7/2020 | Banin | H04L 25/49 | |
| 2022/0147254 A1* | 5/2022 | Kang | G06F 3/0635 | |

OTHER PUBLICATIONS

JEDEC Standard DDR4 SDRAM JESD79-4B, JEDEC Solid State Technology Association, Jun. 2017, pp. i-252. (Discussed on p. 1 of the specification).
PCI Express Base Specification Revision 5.0 Version 1.0, PCI-SIG, May 22, 2019, pp. 1-400. (Discussed on p. 1 of the specification).
PCI Express Base Specification Revision 5.0 Version 1.0, PCI-SIG, May 22, 2019, pp. 401-700. (Discussed on p. 1 of the specification).
PCI Express Base Specification Revision 5.0 Version 1.0, PCI-SIG, May 22, 2019, pp. 701-1000. (Discussed on p. 1 of the specification).
PCI Express Base Specification Revision 5.0 Version 1.0, PCI-SIG, May 22, 2019, pp. 1001-1299. (Discussed on p. 1 of the specification).

* cited by examiner

Figure 5:
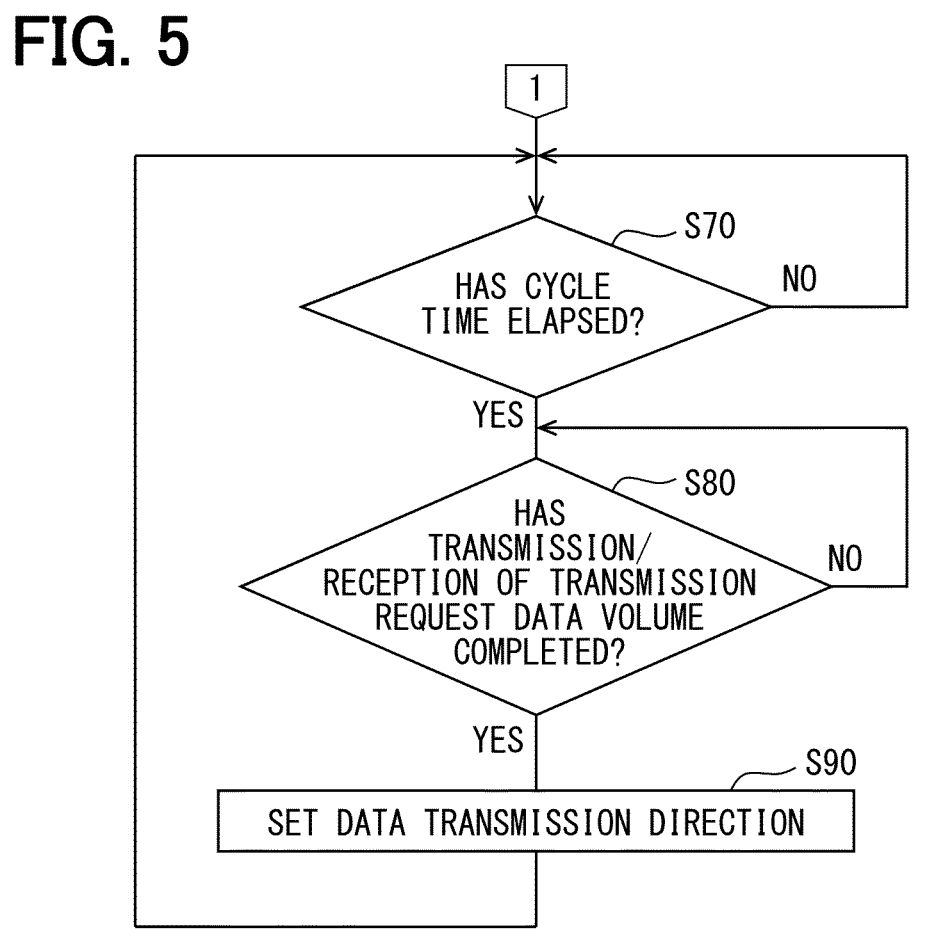

S70
HAS CYCLE
TIME ELAPSED?                    NO

YES

S80
HAS
TRANSMISSION/
RECEPTION OF TRANSMISSION        NO
REQUEST DATA VOLUME
COMPLETED?

YES

S90
SET DATA TRANSMISSION DIRECTION

DATA TRANSMISSION SYSTEM

CROSS REFERENCE TO RELATED APPLICATION

This application is based on Japanese Patent Application No. 2023-113492 filed on Jul. 11, 2023, the disclosure of which is incorporated herein by reference.

TECHNICAL FIELD

The present disclosure relates to a data transmission system.

BACKGROUND

As a bidirectional data transmission method executed between electronic devices, it is possible to adopt the Peripheral Component Interconnect-Express (PCIe) standard, which combines multiple unidirectional transmission paths that transmit data in only one direction, each in a reverse direction. Also, it is possible to adopt a method used in the Double Data Rate 4 (DDR4) standard, in which a bidirectional transmission path is capable of transmitting data bidirectionally and the transmission direction of the bidirectional transmission path is switched as required.

SUMMARY

The present disclosure describes a data transmission system including a first unidirectional transmission path, a second unidirectional transmission path, and a bidirectional transmission path.

BRIEF DESCRIPTION OF DRAWINGS

FIG. 5 is an explanatory diagram showing a procedure of a data transmission process according to the second embodiment.

DETAILED DESCRIPTION

Figure 1:
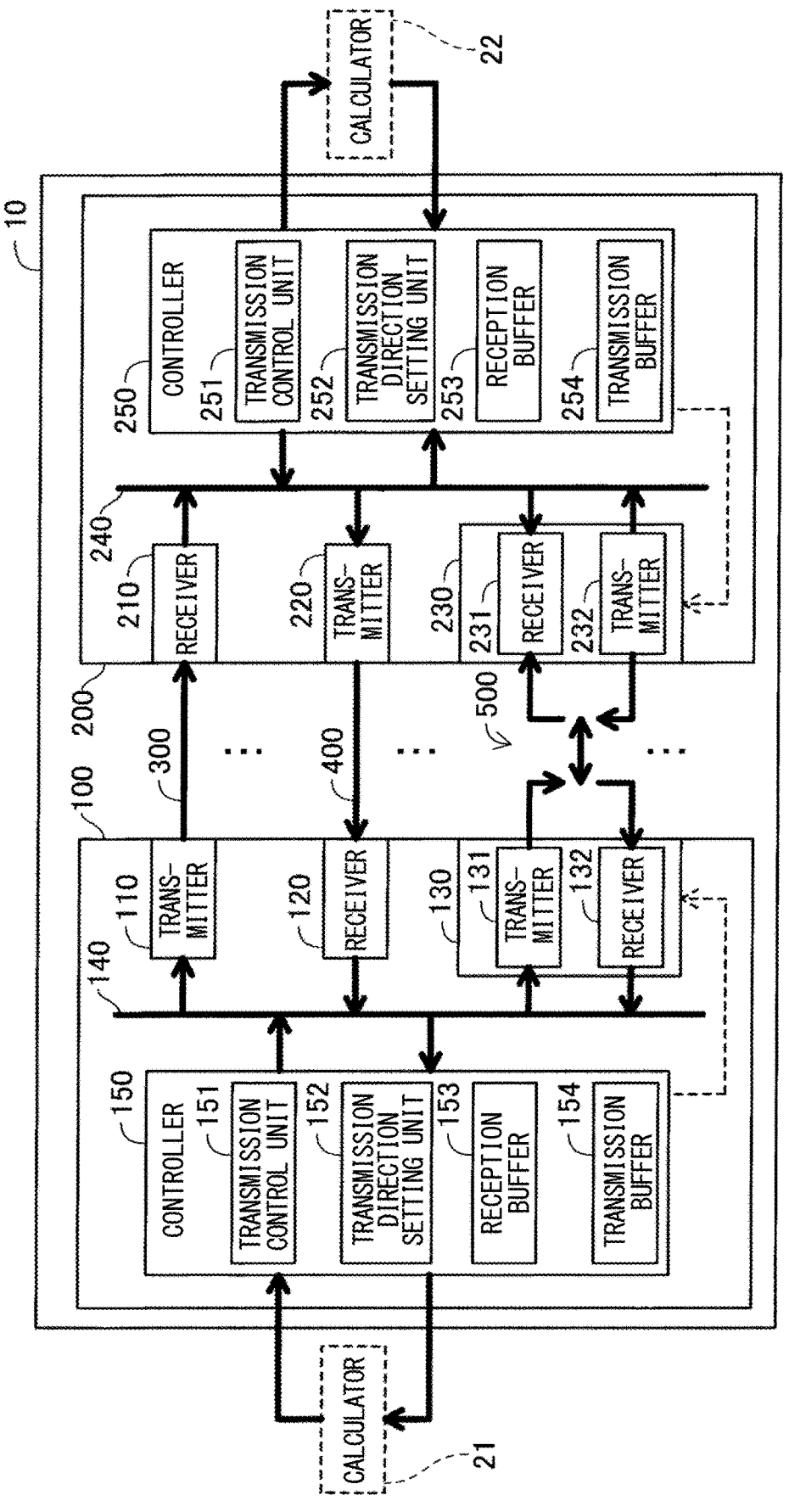
FIG. 1 is a block diagram of a schematic configuration of a data transmission system according to a first embodiment.

In a transmission method in which the PCIe standard is adopted, the number of unidirectional transmission paths is predetermined. Thus, if the data transmission volume is biased toward one transmission direction, the transmission path used for data transmission in the other transmission direction may not be used. Hence, data transmission efficiency may decrease. Furthermore, it is not possible to cope with a case in which the ratio between the data volume transmitted in one transmission direction and the data volume transmitted in the other transmission direction changes from time to time. In the data transmission method adopting the DDR4 standard, data may not be transmitted while the transmission direction is being switched. Hence, data transmission efficiency may decrease. Furthermore, since the bidirectional transmission path is made up of two pairs of transmitters and receivers, a large increase in the manufacturing cost of the data transmission system may be anticipated as compared to a configuration that includes only a unidirectional transmission path made up of one pair of transmitter and receiver.

According to an aspect of the present disclosure, a data transmission system transmits data bidirectionally between two electronic devices. The data transmission system includes a first unidirectional transmission path, a second unidirectional transmission path, a bidirectional transmission path, and a transmission direction setting unit. The first unidirectional transmission path executes data transmission in a first direction from one of the electronics devices to another of the electronic devices. The second unidirectional transmission path executes data transmission in a second direction being opposite to the first direction. The bidirectional transmission path executes data transmission between the two electronic devices in a data transmission direction being set as either the first direction or the second direction. The transmission direction setting unit sets the data transmission direction of the bidirectional transmission path.

According to the data transmission system related to the above aspect, the bidirectional transmission path and the transmission direction setting unit are provided, and the bidirectional transmission path transmits data in the data transmission direction set by the transmission direction setting unit. Therefore, the ratio between the data transmission volume in the first direction and the data transmission volume in the second direction can be adjusted according to the data transmission direction of the bidirectional transmission path. Hence, a decrease in data transmission efficiency can be suppressed. Furthermore, since the data transmission system is provided with not only the bidirectional transmission path but also the first unidirectional transmission path and the second unidirectional transmission path, the manufacturing costs of the data transmission system can be reduced compared to a configuration in which all transmission paths are bidirectional transmission paths.

First Embodiment (System Configuration)

A data transmission system 10 according to the present embodiment is provided between a calculator 21 and a calculator 22, and transmits data bidirectionally between the two calculators. In the following, the data transmission direction in which data is transmitted from the calculator 21 to the calculator 22 may also be referred to as a transmission direction, and the data transmission direction in which data is transmitted from the calculator 22 to the calculator 21 may also be referred to as a reception direction. In the present disclosure, the transmission direction corresponds to a first direction. In the present disclosure, the reception direction corresponds to a second direction. In addition, the data transmission system 10 is not limited to being provided between two calculators, but may be provided between any two electronic devices that exchange data, such as storage devices or communication devices, and may transmit data in both directions between the two electronic devices.

As shown in FIG. 1, a data transmission system 10 according to the present embodiment includes a first transceiver apparatus 100, a second transceiver apparatus 200, a data bus 300, a data bus 400, and a data bus 500. The first transceiver apparatus 100 and the second transceiver apparatus 200 are provided for the calculator 21 and the calculator 22, respectively. The data bus 300, the data bus 400, and the data bus 500 are provided between the first transceiver apparatus 100 and the second transceiver apparatus 200, and connect the first transceiver apparatus 100 to the second transceiver apparatus 200.

The first transceiver apparatus 100 includes a transmitter 110, a receiver 120, a transceiver 130, a bus 140, and a controller 150. The second transceiver apparatus 200 includes a receiver 210, a transmitter 220, a transceiver 230, a bus 240, and a controller 250. Since the structure of the first transceiver apparatus 100 and the structure of the second transceiver apparatus 200 are equivalent, the following description will mainly focus on the first transceiver apparatus 100.

The transmitter 110 transmits data to the receiver 210 via the data bus 300. The transmitter 110, the data bus 300 and the receiver 210 form a data transmission path for transmitting data in the transmission direction between the calculators 21 and 22. Such a data transmission path corresponds to a first unidirectional transmission path in the present disclosure. Although not shown in FIG. 1, the data transmission system 10 according to the present embodiment includes multiple first unidirectional transmission paths.

The receiver 120 receives data from the transmitter 220 via the data bus 400. The receiver 120, the data bus 400, and the transmitter 220 form a data transmission path for transmitting data in the reception direction between the calculators 21 and 22. Such a data transmission path corresponds to a second unidirectional transmission path in the present disclosure. Although not shown in FIG. 1, the data transmission system 10 according to the present embodiment includes multiple second unidirectional transmission paths.

The transceiver 130 includes a transmitter 131 and a receiver 132. The transceiver 130 is capable of switching between the transmitter 131 and the receiver 132 depending on the data transmission direction set by the controller 150, which will be described later. In the following, the state of the transceiver 130 when the transmitter 131 is used is referred to as a transmission state, and the state of the transceiver 130 when the receiver 132 is used is referred to as a reception state. The transceiver 230 included in the second transceiver apparatus 200 includes a receiver 231 and a transmitter 232, as similar to the transceiver 130.

The transceiver 130 and the transceiver 230 are connected to each other via the data bus 500. The data bus 500 is capable of transmitting data in a transmission direction and a reception direction according to the above-mentioned data transmission directions. The transceiver 130, the data bus 500, and the transceiver 230 form a data transmission path for transmitting data bidirectionally between the calculators 21 and 22. Such a data transmission path corresponds to a bidirectional transmission path in present disclosure. Although not shown in FIG. 1, the data transmission system 10 according to the present embodiment includes multiple bidirectional transmission paths.

The controller 150 is connected to the transmitter 110, the receiver 120, and the transceiver 130 via the bus 140. The controller 150 includes a transmission control unit 151, a transmission direction setting unit 152, a transmission buffer 153, and a reception buffer 154. The controller 250 includes a transmission control unit 251, a transmission direction setting unit 252, a reception buffer 253, and a transmission buffer 254. The structure of the controller 150 and the structure of the controller 250 are equivalent. Therefore, the following only describes the controller 150. Each of the transmission direction setting units 152, 252 may also be referred to as a transmission direction setting device.

The transmission control unit 151 controls the data transmission of data output from the calculator 21 (hereinafter also referred to as transmission request data) via the above-mentioned data transmission path. Specific processing by the transmission control unit 151 will be described later.

The transmission direction setting unit 152 sets the data transmission direction of the above-mentioned bidirectional transmission path. More specifically, it sets the state of the transceiver 130 to either the above-mentioned transmission state or the above-mentioned reception state. In the present embodiment, the transmission direction setting unit 152 sets the data transmission direction of the bidirectional transmission path at the time of starting up the data transmission system 10 in accordance with the data transmission direction designated in advance by a user. For example, when it is predicted that the data volume transmitted from calculator 21 to calculator 22 will be greater than the data volume transmitted from calculator 22 to calculator 21, the user specifies the data transmission direction as the transmission direction. In the present embodiment, the transmission direction setting unit 152 sets the data transmission direction of each of the multiple bidirectional transmission paths so that all of the data transmission directions of the multiple bidirectional transmission paths are the same. In this way, the transmission direction setting unit 152 can adjust the ratio between the data transmission volume in the transmission direction and the data transmission volume in the reception direction in accordance with the trend of the data transmission volume in the data transmission system 10 by switching the data transmission direction of the bidirectional transmission path. The first transceiver apparatus 100 and the second transceiver apparatus 200 each include an interface (not shown) for communicating with a terminal such as a personal computer that allows a user to specify the data transmission direction.

The transmission buffer 153 temporarily holds the transmission request data from the calculator 21. The reception buffer 154 temporarily holds the data received from the second transceiver apparatus 200. In this embodiment, the first transceiver apparatus 100 includes one reception buffer 154, but may include two or more reception buffers corresponding to the number of receivers 120.

(Data Transmission Process)

Figure 2:
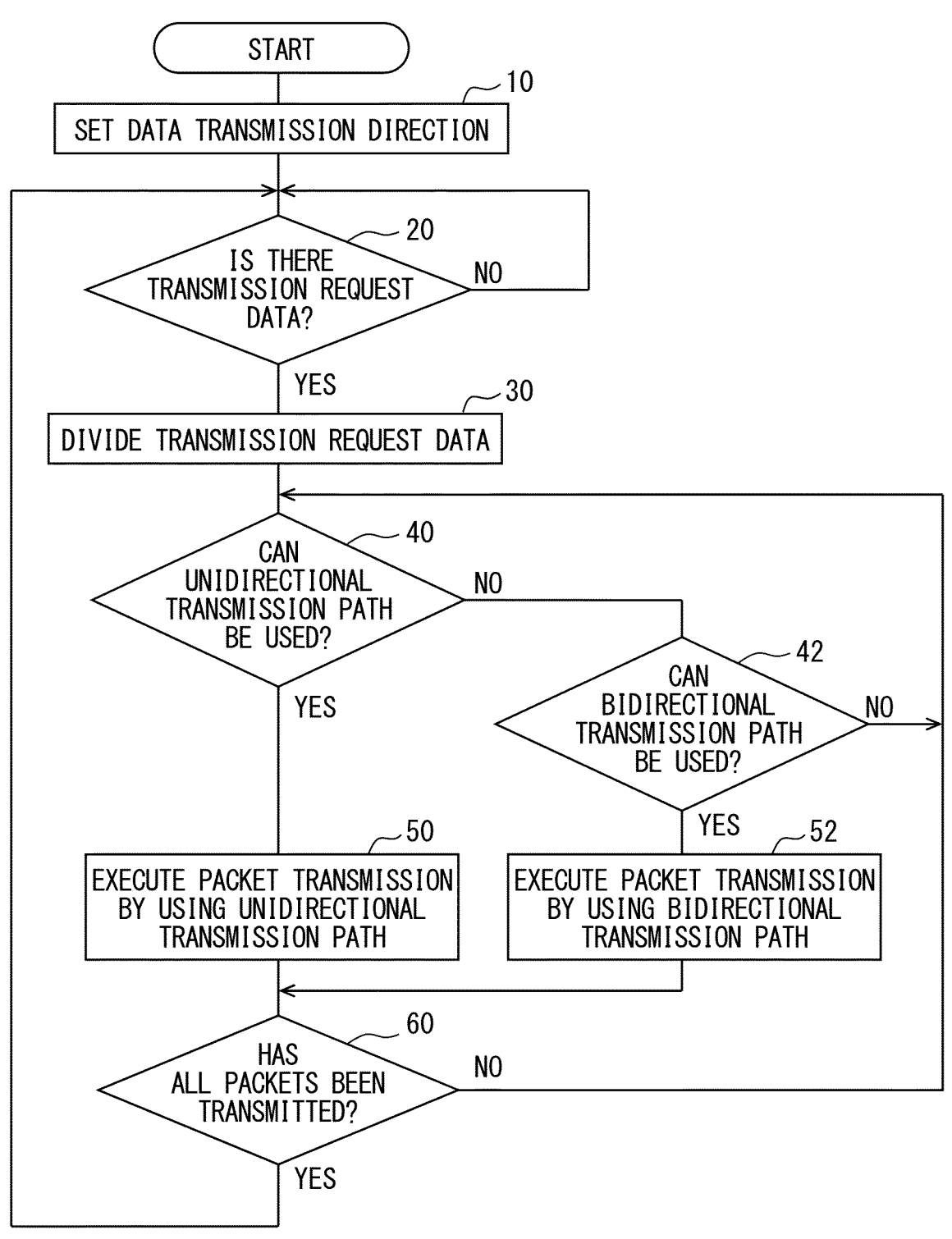
FIG. 2 is a flowchart showing the procedure of a data transmission process according to the first embodiment.

When the data transmission system 10 is started, the controller 150 and the controller 250 start the data transmission process shown in FIG. 2. The processes executed by the controller 150 and the controller 250 are equivalent. Thus, the following only describes the process executed by the controller 150.

In S10, the transmission direction setting unit 152 sets the data transmission direction in accordance with the data transmission direction designated in advance by the user. In the following, it is assumed that the user has specified that the data transmission direction is the transmission direction, and the transmission direction setting unit 152 sets the transceiver 130 to the transmission state.

In S20, the transmission control unit 151 determines whether or not there is transmission request data in the transmission buffer 153. If it is determined that there is no transmission request data (S20: NO), the transmission control unit 151 waits until data is output from the calculator 21. If it is determined that there is transmission request data (S20: YES), the transmission control unit 151 divides the transmission request data into packets having a predetermined data volume in S30. In the present embodiment, the transmission control unit 151 assigns a number indicating the transmission order to each divided packet. Each transmitted packet is temporarily stored in the reception buffer 253 of the controller 250 as the destination, and the controller 250 rearranges the packets in the original order according to the numbers assigned to each packet, and transmits them to the calculator 22. In the present disclosure, the data volume may also be referred to as amount of data.

In S40, the transmission control unit 151 determines whether or not the unidirectional transmission path can be used, that is, whether or not the transmitter 110 is currently transmitting data. If it is determined that the unidirectional transmission path can be used (S40: YES), in S50, the transmission control unit 151 transmits the packet using the unidirectional transmission path.

On the other hand, if it is determined that the unidirectional transmission path cannot be used (S40: NO), the transmission control unit 151 determines whether or not the bidirectional transmission path can be used in S42. "The bidirectional transmission path can be used" means a situation in which the data transmission direction is set to the transmission direction and the transmitter 131 included in the transceiver 130 is not currently transmitting data. In addition, if the data transmission direction is set to the reception direction at the startup of the data transmission system 10, the transmission control unit 151 cannot use the bidirectional transmission path for data transmission in the transmission direction when the data transmission system 10 is in an operating state. In this case, the transmission control unit 151 transmits packets using only the unidirectional transmission path, and therefore does not need to execute the determination in S42.

If it is determined that the bidirectional transmission path can be used (S42: YES), the transmission control unit 151 transmits the packet using the bidirectional transmission path in S52. On the other hand, if it is determined that the bidirectional transmission path cannot be used (S42: NO), the transmission control unit 151 executes S40 again.

After completing S50 or S52, in S60, the transmission control unit 151 determines whether or not all packets have been transmitted. If all packets have not been transmitted (S60: NO), the transmission control unit 151 executes S40 again. On the other hand, if all packets have been transmitted (S60: YES), the transmission control unit 151 executes S20 again. The transmission control unit 151 repeatedly executes S20 to S60 while the data transmission system 10 is in operation.

Figure 3:
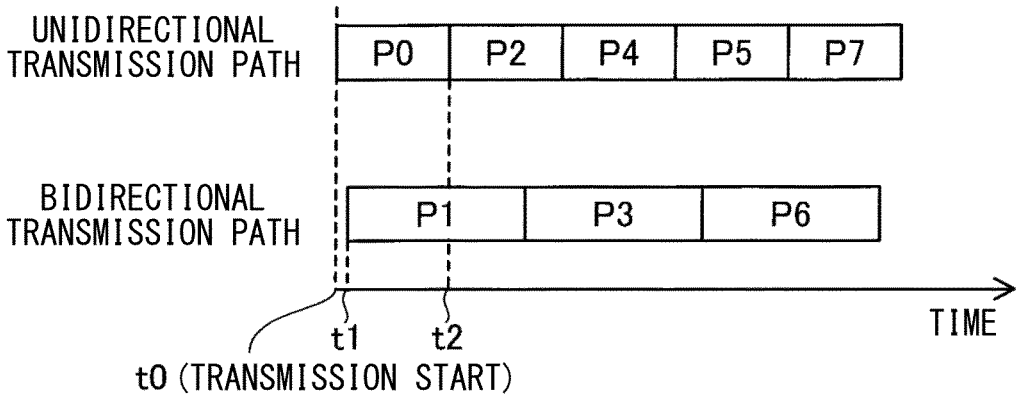
FIG. 3 is an explanatory diagram showing an example of a packet transmission order.

The above-described data transmission process will now be described in more detail with reference to an example shown in FIG. 3. In FIG. 3, the horizontal axis indicates the passage of time, and when transmission request data is divided into eight packets P0 to P7. FIG. 3 shows whether each packet is transmitted using a unidirectional transmission path or a bidirectional transmission path as time passes from the start of transmission. The size of a rectangle representing each packet corresponds to the amount of time required to transmit each packet. That is, even if the data volume is the same, it takes longer to transmit each packet when using the bidirectional transmission line compared to when using the unidirectional transmission line. This is because, in the example shown in FIG. 3, the data bus width of the bidirectional transmission line is smaller than that of the unidirectional transmission line, and the transmission frequency is slower.

At time to when transmission starts, the unidirectional transmission path has not yet been used and is available, so packet P0 is transmitted using the unidirectional transmission path. Thereafter, at time t1 when the transmission of packet P1 starts, the unidirectional transmission path is being used to transmit packet P0 and is therefore unavailable, so packet P1 is transmitted using the bidirectional transmission path which has not yet been used and is available. Subsequently, at time t2 when the transmission of packet P0 ends, the unidirectional transmission path becomes available again, so packet P2 is transmitted using the unidirectional transmission path. Similarly, packets P3 to P7 are transmitted using a transmission path that is available at the time of transmission of each packet. Furthermore, when the packets are transmitted in this manner, they are received at the controller 250 as a destination target in the order of packets P0, P1, P2, P4, P3, P5, P6, and P7, meaning that the transmission order and the reception order are different. Each transmitted packet is temporarily stored in the reception buffer 253, and the controller 250 rearranges the packets in the original order according to the numbers assigned to each packet, and transmits them to the calculator 22.

The data transmission system 10 according to the first embodiment includes a bidirectional transmission path and the transmission direction setting unit 152. The bidirectional transmission path transmits data in the data transmission direction set by the transmission direction setting unit 152. Therefore, the ratio between the data volume transmitted in the transmission direction and the data volume transmitted in the reception direction can be adjusted according to the data transmission direction of the bidirectional transmission path, and a decrease in data transmission efficiency can be suppressed. Furthermore, since the data transmission system 10 is provided with not only a bidirectional transmission path but also a first unidirectional transmission path and a second unidirectional transmission path, the increase in manufacturing costs of the data transmission system 10 can be suppressed compared to a configuration in which all transmission paths are bidirectional transmission paths.

In addition, since the transmission direction setting unit 152 sets the data transmission direction at the start up of the data transmission system 10, there is no need to execute processing to set the data transmission direction when the data transmission system 10 is in an operating state, which prevents the data transmission processing from becoming complicated.

Second Embodiment

Figure 4:
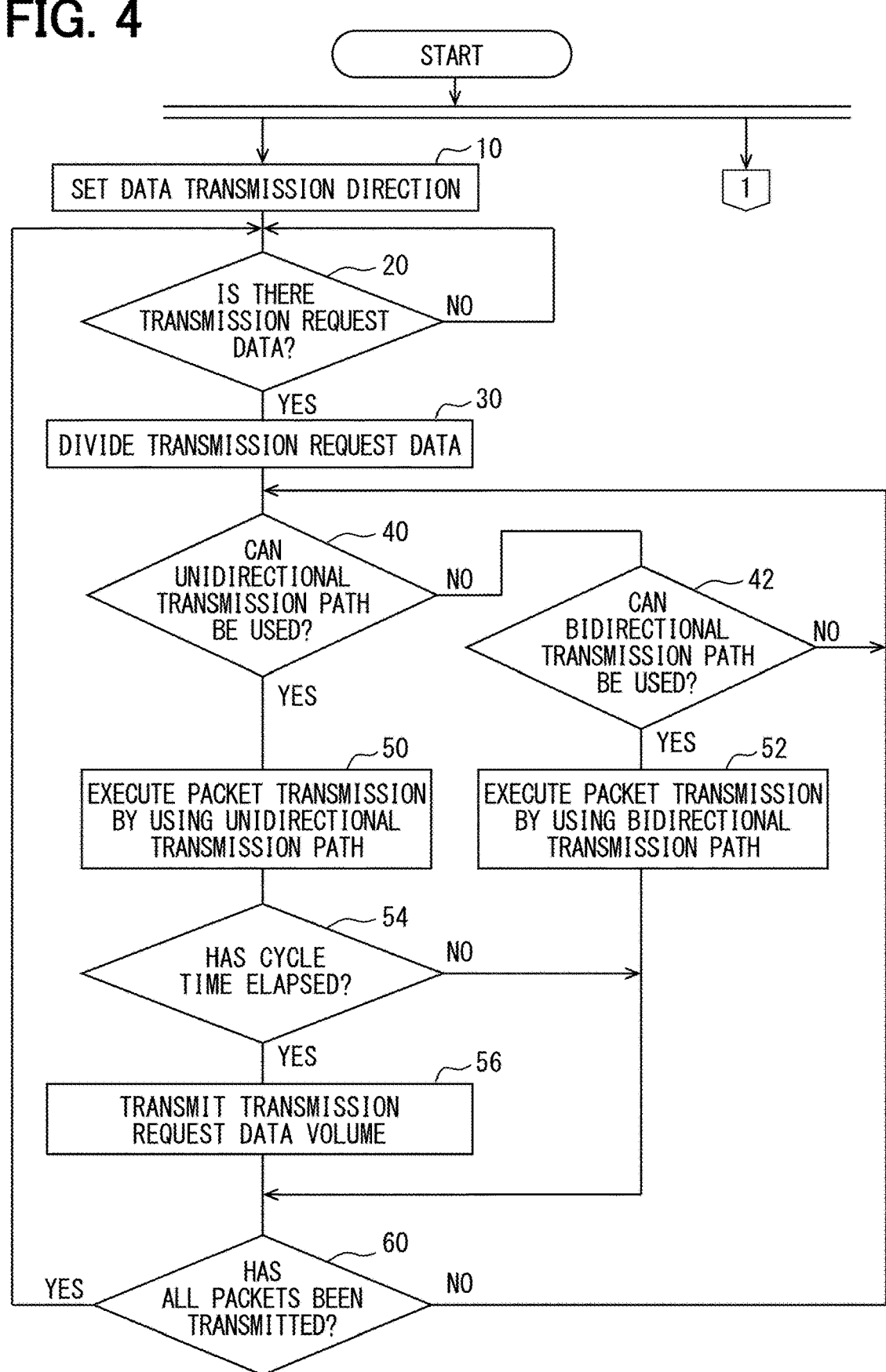
FIG. 4 is an explanatory diagram showing a procedure of a data transmission process according to a second embodiment.

The data transmission system 10 according to a second embodiment differs from the data transmission system 10 according to the first embodiment in that, as shown in FIGS. 4, S54 and S56 are executed after S50, and in that S70, S80 and S90 shown in FIG. 5 are executed in parallel with S10 to S60. The system configuration and other procedures in the data transfer process according to the second embodiment are the same as those of the data transfer process according to the first embodiment, so the same configurations and the same procedures are denoted by the same reference numerals, and a detailed explanation thereof will be omitted.

After S50, the transmission control unit 151 determines whether or not a cycle time has elapsed since the startup of the data transmission system 10 or since a predetermined cycle time has elapsed previously in S54. If it is determined that the cycle time has elapsed (S54: YES), the transmission control unit 151 transmits the data volume of transmission request data held in the transmission buffer 153 (hereinafter also referred to as a first transmission request data volume) to the controller 250 using the unidirectional transmission path in S56. In the controller 250 as well, the transmission control unit 251 transmits the second transmission request data volume held in the transmission buffer 254 to the controller 150 at the same timing. As described above, the transmission request data volume is transmitted after the packet has been transmitted using the unidirectional transmission path and after the cycle time has elapsed, so that it is possible to prevent the transmission of the packet from being hindered due to the transmission of the transmission request data volume. Thereafter, the transmission control unit 151 executes the above-mentioned S60. The cycle time may also be referred to as a periodic time in the present disclosure.

On the other hand, if it is determined that the cycle time has not elapsed (S54: NO), S56 is not executed and the above-mentioned S60 is executed.

As shown in FIGS. 4 and 5, in parallel with the above-mentioned S10 to S60, the transmission direction setting unit 152 determines whether or not the cycle time has elapsed after the data transmission system 10 is started or after the above-mentioned cycle time has elapsed previously in S70. If it is determined that the cycle time has not elapsed (S70: NO), the transmission direction setting unit 152 waits until it is determined that the cycle time has elapsed.

If it is determined that the cycle time has elapsed (S70: YES), the transmission direction setting unit 152 determines whether the transmission of the first transmission request data volume to the controller 250 and the reception of the second transmission request data volume from the controller 250 have already been executed (whether they have been transmitted and received) in S80. If it is determined that transmission and reception have not been completed (S80: NO), the transmission direction setting unit 152 waits until it is determined that transmission and reception have been completed.

If it is determined that transmission and reception have been completed (S80: YES), the transmission direction setting unit 152 determines the data transmission direction in S90. In the present embodiment, the transmission direction setting unit 152 compares the first transmission request data volume obtained from the transmission buffer 153 with the second transmission request data volume received from the controller 250, and sets the data transmission direction so that data is transmitted from the calculator being the transmission source having the larger transmission request data volume to the other calculator.

More specifically, in a case where the first transmission request data volume is larger than the second transmission request data volume, the transmission direction setting unit 152 sets the data transmission direction to the transmission direction so that data is transmitted from the calculator 21, which is the transmission source having the larger transmission request data volume, to the calculator 22. On the other hand, in a case where the second transmission request data volume is larger than the first transmission request data volume, the transmission direction setting unit 152 sets the data transmission direction to the reception direction so that data is transmitted from the calculator 22, which is the transmission source with the larger transmission request data volume, to the calculator 21.

In addition, when S90 is executed by the transmission direction setting unit 152, the transmission direction setting unit 252 similarly sets the data transmission direction so that the state of the transceiver 130 and the state of the transceiver 230 are paired as the transmission state and the reception state, respectively. The data transmission direction is set after the determination in S80 is performed because, if either the transmission of the first transmission request data volume or the reception of the second transmission request data volume has not been completed, either the transmission direction setting unit 152 or the transmission direction setting unit 252 does not have all the information necessary to set the data transmission direction, and it is not possible to set the data transmission direction so that the states of the transceiver 130 and the transceiver 230 are paired with each other.

After S90, the transmission direction setting unit 152 executes S70 again.

Figure 6:
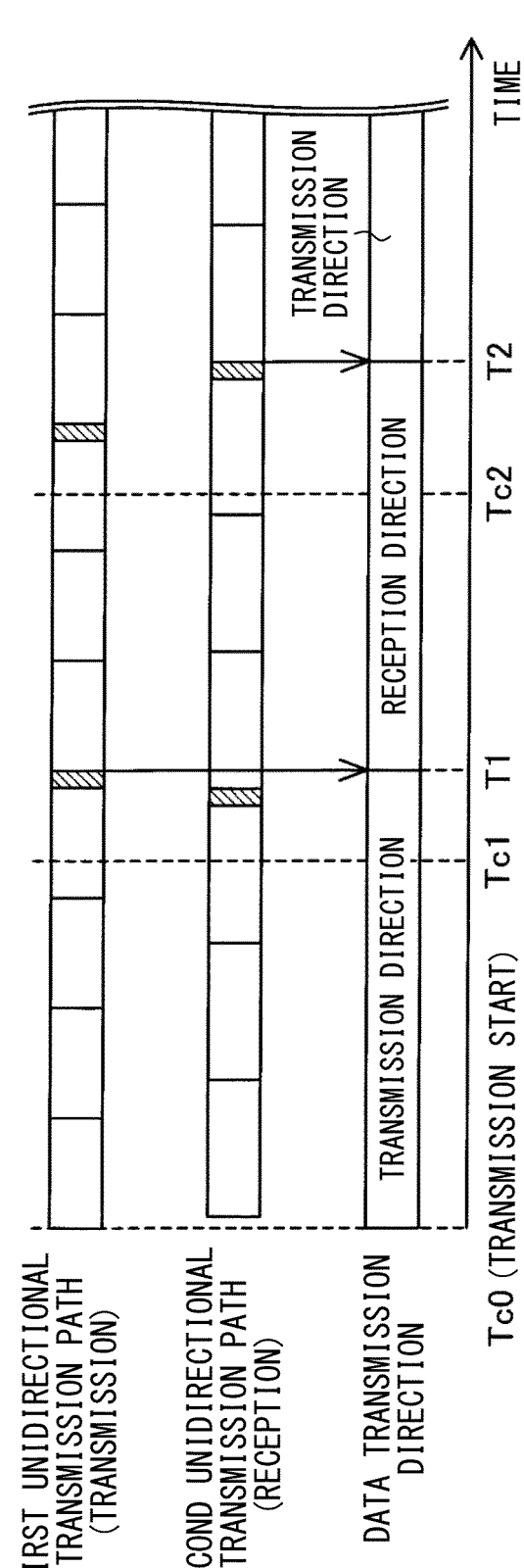
FIG. 6 is an explanatory diagram showing an example of switching of a data transmission direction in the second embodiment.

The above-described switching of the data transmission direction will be described more specifically with reference to an example shown in FIG. 6. In FIG. 6, the horizontal axis indicates the passage of time. FIG. 6 shows: the timing when a first transmission request data volume is transmitted via a first unidirectional transmission path; the timing when a second transmission request data volume is received via a second unidirectional transmission path; and the timing when the data transmission direction is switched on a bidirectional transmission path. The white-outlined rectangle represents the packets transmitted via each unidirectional communication path, with the size of the rectangle corresponding to the amount of time required to transmit each packet. In the example shown in FIG. 6, the data bus width of the second unidirectional transmission path is smaller than that of the first unidirectional transmission path, and it takes longer to transmit each packet in the reception direction even for the same data volume. Moreover, the hatched rectangle represents the transmission data volume requested to be transmitted via each unidirectional transmission line.

After data transmission starts at time Tc0, the cycle time elapses at time Tc1. Afterwards, at time T1, the transmission direction setting unit 152 sets the data transmission direction at the timing when the transmission and reception are completed due to the transmission of the first transmission request data volume, delayed from the reception of the second transmission request data volume. In the example of FIG. 6, the transmission direction setting unit 152 determines that the second requested data volume is larger than the first requested data volume, and switches the data transmission direction from the transmission direction to the reception direction.

Then, at time Tc2, the cycle time elapses again. Afterwards, at time T2, the transmission direction setting unit 152 sets the data transmission direction at the timing when the transmission and reception are completed due to the reception of the second transmission request data volume, delayed from the transmission of the first transmission request data volume. In the example of FIG. 6, the transmission direction setting unit 152 determines that the first transmission request data volume is larger than the second transmission request data volume, and switches the data transmission direction from the reception direction to the transmission direction.

According to the data transmission system 10 according to the second embodiment described above, the first transmission request data volume and the second transmission request data volume are obtained and compared with each other, and the data transmission direction is set so that data is transmitted from the source calculator having the larger transmission request data volume to the other calculator. Therefore, even if the ratio between the data transmission volume in the transmission direction and the data transmission volume in the reception direction changes from time to time, the data transmission direction can be appropriately set. Thus, a decrease in data transmission efficiency can be further suppressed.

Furthermore, since the transmission direction setting unit 152 obtains the first transmission request data volume by using the second unidirectional transmission path, and the transmission direction setting unit 252 obtains the second transmission request data volume by using the first unidirectional transmission path, there is no need to provide an additional configuration for obtaining the transmission request data volume. Thus, an increase in the manufacturing cost of the data transmission system 10 can be suppressed.

Third Embodiment

Figure 7:
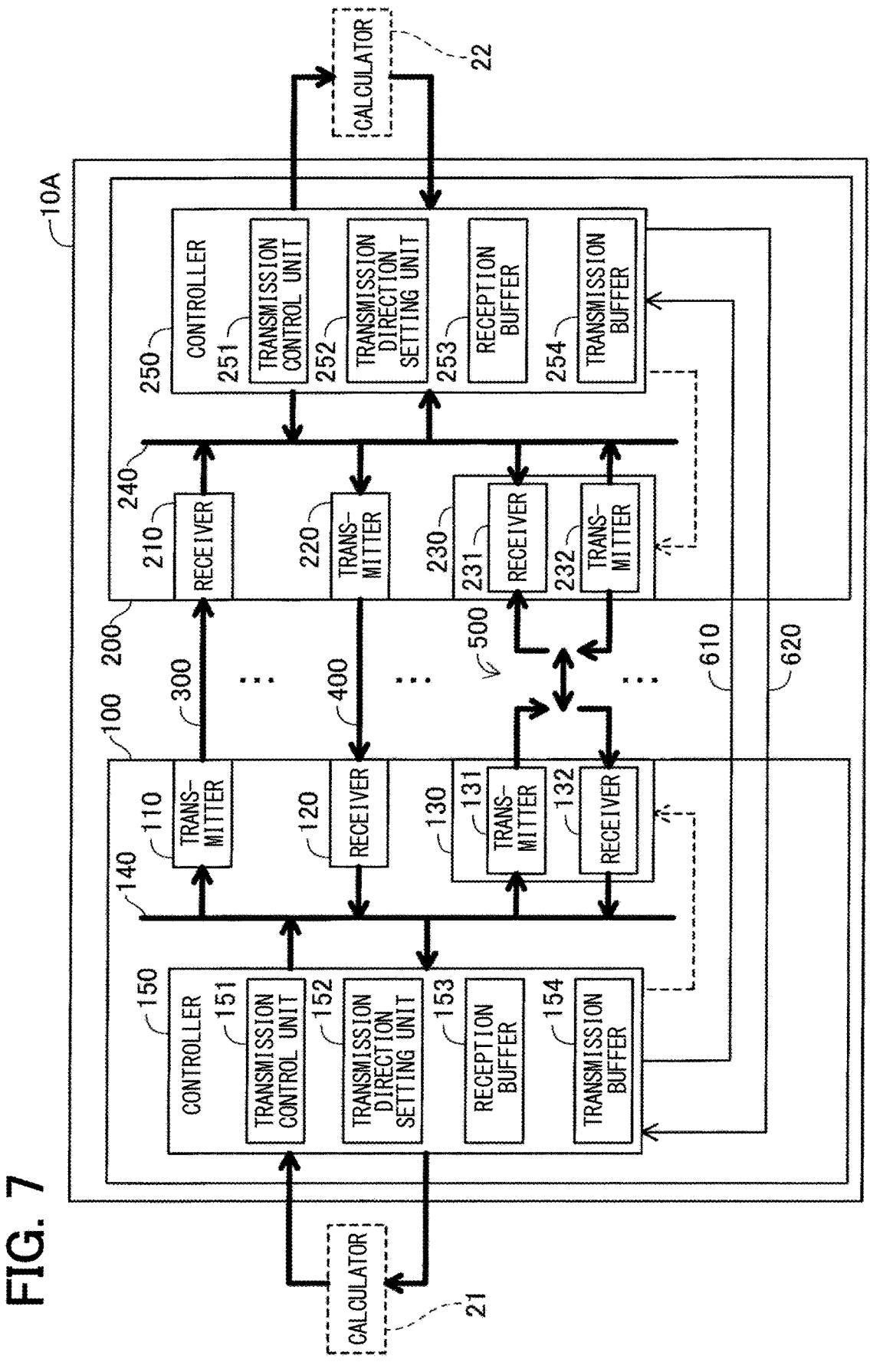
FIG. 7 is a block diagram of a schematic configuration of a data transmission system according to a third embodiment.

As shown in FIG. 7, a data transmission system 10A according to a third embodiment differs from the data transmission system 10 according to the second embodiment in that it further includes data-volume transmission paths 610 and 620. The system configuration and other procedures in the data transmission process of the data transmission system 10A according to a third embodiment are the same as those of the data transmission system 10 according to the second embodiment, so the same configurations and the same procedures are denoted by the same reference numerals, and a detailed explanation thereof will be omitted.

As shown in FIG. 7, the data transmission system 10A according to the third embodiment further includes data-volume transmission paths 610 and 620. The data-volume transmission path 610 connects the controller 150 to the controller 250. In the present embodiment, the transmission control unit 151 transmits the first transmission request data volume to the controller 250 via the data-volume transmission path 610 instead of the unidirectional transmission path. In addition, the data-volume transmission path 620 connects the controller 150 to the control unit 250. In the present embodiment, the transmission control unit 251 transmits the second transmission request data volume to the controller 150 via the data-volume transmission path 620 instead of the unidirectional transmission path. This allows the controller 150 and the controller 250 to exchange the transmission request data volume at any timing, regardless of the usage state of the unidirectional transmission path. Since the data-volume transmission path 610 and the data-volume transmission path 620 are used only for transmitting the transmission request data volume, the data bus width may be smaller than that of the above-mentioned unidirectional transmission path.

The data transmission system 10A according to the third embodiment includes the data-volume transmission paths 610, 620. The transmission direction setting unit 152 and the transmission direction setting unit 252 acquire the transmission request data volume via the data-volume transmission paths 610, 620, respectively. Therefore, the transmission request data volume can be exchanged at any timing regardless of the usage state of the unidirectional transmission path. Therefore, it is not necessary to determine whether or not the requested data volume can be transmitted in the data transmission process, and the process can be prevented from becoming complicated. In addition, since the transmission request data volume can be exchanged at any timing regardless of the usage state of the unidirectional transmission path, the difference in the timing of transmitting and receiving the first transmission request data volume and the second transmission request data volume can be suppressed, and delays in the timing of switching the data transmission direction can be suppressed.

Other Embodiments

In the above embodiment, the data transmission system 10 includes multiple first unidirectional transmission paths, multiple second unidirectional transmission paths, and multiple bidirectional transmission paths. However, the present disclosure is not limited to this situation. The data transmission system 10 may include one first unidirectional transmission path, one second unidirectional transmission path, and one bidirectional path. The data transmission system 10 related to the above aspect also provides the same effects as the above embodiment.

In the above embodiment, the data transmission system 10 includes the transmission direction setting unit 152 and the transmission direction setting unit 252. However, the present disclosure is not limited to this situation. The data transmission system 10 may include only the transmission direction setting unit 152, which sets the state of the transceiver 230 in addition to the transceiver 130. For example, the transmission direction setting unit 152 may set the state of the transceiver 230 by sending a control signal to the second transceiver apparatus 200 using the first unidirectional transmission path to set the state of the transceiver 230.

In the above embodiment, the transmission direction setting unit 152 sets the data transmission direction of each of the multiple bidirectional transmission paths so that all of the data transmission directions of the multiple bidirectional transmission paths are the same. However, the present disclosure is not limited to this situation. The transmission direction setting unit 152 may set the data transmission direction such that the data transmission directions of some of the multiple bidirectional transmission paths are opposite to each other. According to the data transmission system 10 related to the above aspect, the ratio between the data volume transmitted in the transmission direction and the data volume transmitted in the reception direction can be finely adjusted, and a decrease in data transmission efficiency can be further suppressed.

In the above embodiment, the transmission control unit 151 divides the transmission request data into packets and transmits the divided packets. However, the present disclosure is not limited to this situation. If the transmission frequencies of the unidirectional transmission path and the bidirectional transmission path are the same and the unidirectional transmission path and the bidirectional transmission path can be regarded as a single data bus, the transmission control unit 151 may transmit the transmission request data without dividing it into packets. According to the data transmission system 10 described above, the processing of S30 to S60 in the data transmission process are unnecessary, so that the processes in the data transmission system 10 can be prevented from becoming complicated.

In the above second-mentioned embodiment, the transmission direction setting unit 152 sets the data transmission direction by comparing the first transmission request data volume with the second transmission request data volume in the operating state of the data transmission system 10. However, the present disclosure is not limited to this situation. For example, the transmission direction setting unit 152 may receive a data transmission direction from the calculator 21 or the calculator 22 while the data transmission system 10A is in operation, and then set the data transmission direction to be the specified data transmission direction. Such a data transmission system 10A also provides the same effects as those of the second embodiment.

The data transmission system 10 and methods thereof described in the present disclosure may be implemented by a dedicated computer including a processor and a memory programmed to perform one or more functions embodied by a computer program. Alternatively, the data transmission system 10 and the method thereof described in the present disclosure may be implemented by a dedicated computer including a processor implemented by one or more dedicated hardware logic circuits. Alternatively, the data transmission system 10 and the methods thereof described in the present disclosure may be implemented by one or more dedicated computers implemented by a combination of a processor and memory programmed to execute one or more functions, and a processor implemented by one or more hardware logic circuits. The computer program may be stored in a computer-readable non-transitory tangible recording medium as an instruction to be executed by the computer.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described issues, or to provide one of the above-described effects. In order to achieve a part or all, replacement or combination can be appropriately performed. Also, some of the technical features may be omitted as appropriate.

What is claimed is:

1. A data transmission system configured to execute data transmission bidirectionally between two electronic devices, the data transmission system comprising:

a first unidirectional transmission path configured to allow the data transmission in a first direction from one of the two electronic devices to another one of the two electronic devices;

a second unidirectional transmission path configured to allow the data transmission between the two electronic devices in a second direction being opposite to the first direction;

a bidirectional transmission path configured to allow the data transmission between the two electronic devices in a data transmission direction set to be either the first direction or the second direction; and at least one of (i) a circuit and (ii) a processor with a memory storing computer program code executable by the processor, the at least one of the circuit and the processor configured to cause the data transmission system to:

allow a user to set the data transmission direction for the bidirectional transmission path in advance, wherein the at least one of the circuit and the processor configured to cause the data transmission system to:

divide data, which is provided from one of the two electronic devices, into a packet after the data transmission direction of the bidirectional transmission path is preliminarily set by the user;

determine whether or not the first unidirectional transmission path executes the data transmission after the data is divided into the packet;

transmit the packet to the other of the two electronic devices via the first unidirectional transmission path, in response to determining that the first unidirectional transmission path does not executes the data transmission;

determine whether or not the bidirectional transmission path executes the data transmission, in response to determining that the first unidirectional transmission path executes the data transmission; and transmit the packet to the other of the two electronic devices via the bidirectional transmission path, in response to determining that the bidirectional transmission path does not execute the data transmission.

2. The data transmission system according to claim 1, wherein the at least one of the circuit and the processor is configured to cause the data transmission system to set the data transmission direction at startup of the data transmission system.

3. The data transmission system according to claim 1, wherein the at least one of the circuit and the processor is configured to cause the data transmission system to set the data transmission direction each time a predetermined cycle time has elapsed, during the data transmission system being in operation.

4. The data transmission system according to claim 3, wherein:

the at least one of the circuit and the processor is configured to cause the data transmission system to:

acquire a transmission request data volume from each of the two electronic devices serving as transmission sources, and then execute comparison between the two electronic devices according to the transmission request data volume acquired from each of the two electronic devices, and set the data transmission direction to allow one of the two electronic devices, which has a larger transmission request data volume than another one of the two electronic devices, to execute the data transmission to the other one of the two electronic devices based on a result of the comparison.

5. The data transmission system according to claim 4, wherein:

the at least one of the circuit and the processor is provided for each of the two electronic devices; and the at least one of the circuit and the processor is configured to cause the data transmission system to acquire the transmission request data volume from another one of the two electronic devices via either the first unidirectional transmission path or the second unidirectional transmission path.

6. The data transmission system according to claim 4, further comprising:

a data-volume transmission path being different from the first unidirectional transmission path, the second unidirectional transmission path, and the bidirectional transmission path, the data-volume transmission path configured to allow transmission of the transmission request data volume from each of the two electronic devices, wherein the at least one of the circuit and the processor is configured to cause the data transmission system to acquire the transmission request data volume via the data-volume transmission path.

7. The data transmission system according to claim 1, wherein the at least one of the circuit and the processor is configured to cause the data transmission system to:

determine again whether or not the first unidirectional transmission path executes the data transmission, in response to determining that the bidirectional transmission path executes the data transmission.

8. The data transmission system according to claim 1, wherein the at least one of the circuit and the processor is configured to set allow the user to set the data transmission direction of the bidirectional transmission path in advance at startup of the data transmission system.

9. The data transmission system according to claim 1, wherein the bidirectional transmission path is one of bidirectional transmission paths, and the at least one of the circuit and the processor is configured to set all of respective data transmission directions of the bidirectional transmission paths to be identical.

* * * * *